United States Patent [19]

Feray et al.

[11] Patent Number: 5,011,613

[45] Date of Patent: Apr. 30, 1991

[54] METHOD FOR REGULATING THE RESIDUAL FREE CHLORINE IN WATER

[75] Inventors: Cathy Feray, Suresnes; Conrad Hubele, L'Etang La Ville, both of France

[73] Assignee: Lyonnaise des Eaux, Paris, France

[21] Appl. No.: 466,908

[22] Filed: Jan. 18, 1990

[30] Foreign Application Priority Data

Feb. 16, 1989 [FR] France .................................. 89 02042

[51] Int. Cl.$^5$ .............................................. C02F 1/76
[52] U.S. Cl. ................................... 210/739; 210/754; 210/764; 210/766
[58] Field of Search ............... 210/739, 749, 753, 754, 210/756, 764, 766

[56] References Cited

U.S. PATENT DOCUMENTS

| | | | |
|---|---|---|---|
| 3,528,545 | 9/1970 | Frazel et al. | 210/96.1 |
| 3,732,164 | 5/1973 | Pressley et al. | 210/756 |
| 3,760,829 | 9/1973 | Schuk et al. | 210/739 |
| 4,056,470 | 11/1977 | Carpenter | 210/754 |
| 4,435,291 | 3/1984 | Matsko | 210/739 |

*Primary Examiner*—Peter Hruskoci
*Assistant Examiner*—Krisanne Shideler
*Attorney, Agent, or Firm*—Pollock, VandeSande & Priddy

[57] ABSTRACT

A method for regulating the residual free chlorine in drinking water, characterized in that the regulation is carried out by introduction of a quantity of chlorine determined as a function of the chlorine demand at "the head" of the line, that is upstream of the water treatment or storage line, while obtaining in the distribution network, water having an acceptable residual free chlorine content. The chlorine demand of the water at the inlet of the treatment, or storage line is rapidly determined by accelerating, the reactions tied to disinfection by heating so as to obtain over a short period (from 5 to 10 minutes) water having a residual free chlorine content corresponding to the required value.

3 Claims, No Drawings

METHOD FOR REGULATING THE RESIDUAL FREE CHLORINE IN WATER

FIELD AND BACKGROUND OF THE INVENTION

The water intended for distribution for urban or industrial uses is generally treated by means appropriate to minimize pollution, then stored and distributed.

In order to avoid organic developments, whether of algae, bacteria or pathogenic germs, it is necessary to inject a disinfectant, generally chlorine, upstream of a treatment or storage line, with a dosage such that the water is disinfected and that there remains at the distribution network inlet only a certain quantity of chlorine, called residual chlorine—generally from 0.05 to 0.2 mg/l.

A contact period is necessary for the disinfection of the water which has to be stored during that time, but the storage period can be variable, particularly so as to meet the downstream demand variations, while the upstream production is continuous.

The usual practice is to control more particularly the concentration of residual chlorine at the distribution network inlet, that is at the storage outlet, and to set in consequence the dosage of chlorine injected at the storage inlet.

This method is not satisfactory since one has to wait for a period at least equal to the storage duration in order to check that the desired result has been obtained for a given setting, the consumption of chlorine for the disinfection during storage not being predictable in advance; in particular, where there is a water quality deterioration upstream, causing a chlorine demand which is above what had been foreseen, one can find it out only long afterwards, when all the storage has been affected by the chlorine deficiency. When frequent water quality variations occur, an accurate setting is not possible and the dosage of chlorine has to be adjusted arbitrarily either to a level corresponding to the maximum demand, or to a medium level. In the first case, there is a risk of an excessive consumption of chlorine and a deterioration of the organoleptic qualities of drinkable waters during the periods where the demand is small; and in the second case the risk is that during the peak periods where the chlorine demand is high, the disinfection is insufficient and the network is polluted.

OBJECTS AND SUMMARY OF THE INVENTION

The method according to the invention consists in establishing a regulation, no longer "downstream" but "upstream", by introducing in the water a determined quantity of chlorine, as a function not of the residual free chlorine content at the storage outlet, that is at the distribution network inlet, but as a function of the chlorine demand at "the head" of the line, that is prior to storage, at the inlet of the line.

The method according to the invention implies determining quickly the chlorine demand of the water at the storage inlet, thereby allowing a setting of the chlorine injection adapted to the demand, with a very short response period.

According to a feature of the invention, the reactions tied to the disinfection are accelerated by heating, so as to obtain after very short periods, for example from 5 to 10 minutes, a measure of the residual free chlorine value corresponding to the results checked so far at the storage outlet. The method keeps in account the various compounds likely to intervene on the chlorine demand, particularly ammonia, organic matters, $FE^{--}$, $NO^{2-}$ ions.

To this end, raw water is being sampled and successive analyses are carried out, for a period on the order of 5 minutes each, with increasing dosages of chlorine, so as to measure the residual free chlorine appearing beyond the critical point, usually called "Break-point".

In order to reach this object, there is used according to the invention:

a spherical flask heated at 45° C. under agitation and with a temperature probe, a reaction isotherm spherical flask; the reaction period, of about 5 to 10 minutes, is determined by pre-tests and varies according to the nature of the water, a coolant at 20° C., a free chlorine analyzer which allows for carrying out successive and close measurements, each lasting about 2 minutes.

The holding time in the reaction isotherm spherical flask determines the duration of the cycle.

The value of the residual free chlorine is registered in a memory for each test made as a function of the quantity of chlorine introduced; a graphics software permits plotting the curve of the chlorine: free chlorine demand as a function of the chlorine introduced.

As a function of a fixed free chlorine value serving as a set-point, one immediately defines with this curve the concentration of chlorine to be introduced in the water, and it is possible to regulate the dosage of chlorine to be introduced upstream of the storage, as a function of the chlorine demand for the water fed to it.

The chlorine demand results from the presence in the water of certain compounds which can be directly measurable or detectable (measurement of the optical density at 254 nanometers, dosage of ammonia, of $FE^{2+}$, $NH^{2+}$ ions, ...).

These parameters may be the object of an automatic check which tells about the quality of the water. If this quality is constant, it is not necessary to reproduce the chlorine demand measurement protocol and one may be contented with checking at regular intervals a point on the residual free chlorine curve, in the vicinity of the set-point. If the quality of the raw water varies substantially, a complete curve of chlorine consumption is then plotted so as to determine the new dosage of chlorine to be introduced for obtaining the residual free chlorine concentration, fixed as a set-point.

We claim:

1. A method for regulating the residual-free chlorine in drinking water wherein regulation is carried out by introducing a quantity of chlorine determined as a function of the chlorine demand upstream of a water treatment of storage line, while producing water in a distribution network having a residual-free chlorine content at a set point; wherein the chlorine demand for the water at a treatment or storage line inlet is determined by accelerating, by heating to a preselected temperature, chlorine reactions with untreated water samples so as to obtain, over a period of time, from about 5–10 minutes, water having a residual-free chlorine content corresponding to a value required for drinking; wherein heating allows for a measure of the chlorine demand due to compounds including ammonia, organic matter, and iron ions, whereby chlorine disinfection is completed within 10 minutes.

2. The method set forth in claim 1 together with the steps of successively measuring the residual-free chlorine in raw water samples to which increasing dosages of chlorine are added; and wherein a heating enclosure is used for the successive measurements performed on raw water, the enclosure being provided with means for agitation and a temperature probe as well as an isotherm enclosure from which the sample to be analyzed passes through a coolant and finally a chlorine analyzer adapted to carry out successive measurements of residual-free chlorine.

3. The method set forth in claim 2 wherein the heating temperature of the heating enclosure is approximately 45° C. and wherein the coolant temperature is approximately 20° C.

* * * * *